United States Patent
Franceschini et al.

(10) Patent No.: US 10,452,280 B2
(45) Date of Patent: Oct. 22, 2019

(54) HYBRID STORAGE SYSTEM EMPLOYING RECONFIGURABLE MEMORY

(71) Applicant: International Business Machines Corporation, Armonk, NY (US)

(72) Inventors: Michele M. Franceschini, Croton on Hudson, NY (US); Ken Inoue, Ossining, NY (US); Luis A Lastras-Montano, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 14/505,575

(22) Filed: Oct. 3, 2014

(65) Prior Publication Data
US 2016/0098213 A1 Apr. 7, 2016

(51) Int. Cl.
*G06F 12/00* (2006.01)
*G06F 3/06* (2006.01)
(Continued)

(52) U.S. Cl.
CPC ............ *G06F 3/0616* (2013.01); *G06F 3/064* (2013.01); *G06F 3/0679* (2013.01)

(58) Field of Classification Search
CPC .... G06F 3/0665; G06F 3/0689; G06F 3/0608; G06F 3/0631; G06F 3/0647;
(Continued)

(56) References Cited

U.S. PATENT DOCUMENTS 8,341,339 B1 12/2012 Boyle et al.
8,935,493 B1 * 1/2015 Dolan .................. G06F 3/0649
711/117
(Continued)

OTHER PUBLICATIONS

Lin, L. et al.; "Hot Random Off-loading: A Hybrid Storage System with Dynamic Data Migration"; MASCOTS'11 Proceedings of the 2011 IEEE 19th Annual International Symposium on Modeling, Analysis and Simulation of Computers and Telecommunications Systems; 2011, pp. 318-325.
(Continued)

*Primary Examiner* — Mark A Giardino, Jr.
(74) *Attorney, Agent, or Firm* — Cantor Colburn LLP; Jason Sosa

(57) ABSTRACT

A method includes comparing a number of memory blocks in a first pool of free memory blocks in a memory to a threshold. The memory includes memory blocks that are logically divided into the first pool, a second pool, and a third pool of memory blocks. The first pool of free memory blocks is expanded based on determining that the number of memory blocks in the first pool of free memory blocks is less than the threshold. The expanding includes: selecting a first memory block from the second pool of memory blocks, the first memory block comprising active and non-active content; selecting a second memory block from the third pool of memory blocks; copying the active content of the first memory block to the second memory block; erasing the first memory block; and adding the first memory block to the first pool of free memory blocks.

16 Claims, 4 Drawing Sheets

(51) Int. Cl.
*G06F 13/00* (2006.01)
*G06F 13/28* (2006.01)

(58) Field of Classification Search
CPC .... G06F 3/0644; G06F 3/0685; G06F 3/0683; G06F 12/023; G06F 3/064; G06F 9/5077; G06F 12/0246; G06F 2209/5011; G06F 3/0617; G06F 2201/81; G06F 3/067; G06F 11/1448; G06F 12/0811; G06F 12/0871; G06F 12/123; G06F 12/122
See application file for complete search history.

(56) References Cited

U.S. PATENT DOCUMENTS

| | | | | |
|---|---|---|---|---|
| 8,977,825 | B1* | 3/2015 | Lewine | G06F 13/00 711/156 |
| 2007/0168634 | A1* | 7/2007 | Morishita | G06F 3/0608 711/170 |
| 2010/0146197 | A1* | 6/2010 | Gorobets | G06F 12/0246 711/103 |
| 2011/0029715 | A1 | 2/2011 | Hu et al. | |
| 2011/0138105 | A1* | 6/2011 | Franceschini | G06F 12/0246 711/103 |
| 2011/0283078 | A1* | 11/2011 | Tamura | G06F 3/0611 711/170 |
| 2012/0221784 | A1* | 8/2012 | Ban | G06F 12/0246 711/103 |
| 2012/0311293 | A1* | 12/2012 | Nemazie | G11C 16/0483 711/171 |
| 2012/0324443 | A1 | 12/2012 | Low et al. | |
| 2013/0132641 | A1* | 5/2013 | Suzuki | G06F 12/0246 711/103 |
| 2013/0265825 | A1* | 10/2013 | Lassa | G06F 3/0619 365/185.11 |
| 2013/0268741 | A1* | 10/2013 | Daly | G06F 12/023 711/165 |
| 2015/0003156 | A1* | 1/2015 | Berckmann | G11C 29/88 365/185.09 |
| 2015/0058530 | A1* | 2/2015 | Reddy | G06F 3/0616 711/103 |
| 2015/0186259 | A1* | 7/2015 | Thomas | G06F 12/0246 711/103 |

OTHER PUBLICATIONS

Ou, Y. et al.; Towards an efficient flash-based mid-tier cache; Database and Expert Systems Applications. Proceedings of the 23rd International Conference, DEXA 2012, pp. 55-70.

Wu, X. et al.; "Exploiting concurrency to improve latency and throughput in a hybrid storage system"; MASCOTS'10 Proceedings of the 2010 IEEE International Symposium on Modeling, Analysis and Simulation of Computers and Telecommunications; 2010, pp. 14-23.

\* cited by examiner

HYBRID STORAGE SYSTEM EMPLOYING RECONFIGURABLE MEMORY

BACKGROUND

The present invention relates generally to computer memory, and more specifically to a hybrid storage system that employs reconfigurable memory.

Flash memories are increasingly being used as non-volatile storage media in both consumer and enterprise applications. Flash memory stores information in an array of memory cells made from floating-gate transistors. In traditional single-level cell (SLC) devices, each cell stores only one bit of information. Other flash memory devices, such as multi-level cell (MLC) devices, including triple-level cell (TLC) devices, can store more than one bit per cell by choosing between multiple levels of electrical charge to apply to the floating gates of its cells. One limitation of flash memory is that, although it can be read or programmed a byte or a word at a time in a random access fashion, it can only be erased one block at a time. Flash memory is also characterized by a limited endurance (also referred to as a "limited life") due to its ability to undergo only a finite number of program-erase cycles. For example, some commercially available flash products are guaranteed to withstand around one-hundred thousand program-erase cycles before the wear begins to deteriorate the integrity of the storage. Various techniques (e.g., wear leveling, data coding) have been developed to increase the overall endurance of a flash device, however, these techniques often result in impacting other memory metrics such as capacity, read performance, write performance, and power usage.

SUMMARY

Embodiments include computer implemented methods, systems and computer program products for storing data in memory. A method includes comparing a number of memory blocks in a first pool of free memory blocks in the memory to a threshold. The memory includes memory blocks that are logically divided into the first pool of free memory blocks, a second pool of memory blocks and a third pool of memory blocks. The first pool of free memory blocks is expanded based on determining that the number of memory blocks in the first pool of free memory blocks is less than the threshold. The expanding includes: selecting a first memory block from the second pool of memory blocks, the first memory block comprising active and non-active content; selecting a second memory block from the third pool of memory blocks; copying the active content of the first memory block to the second memory block; erasing the first memory block; and adding the first memory block to the first pool of free memory blocks.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
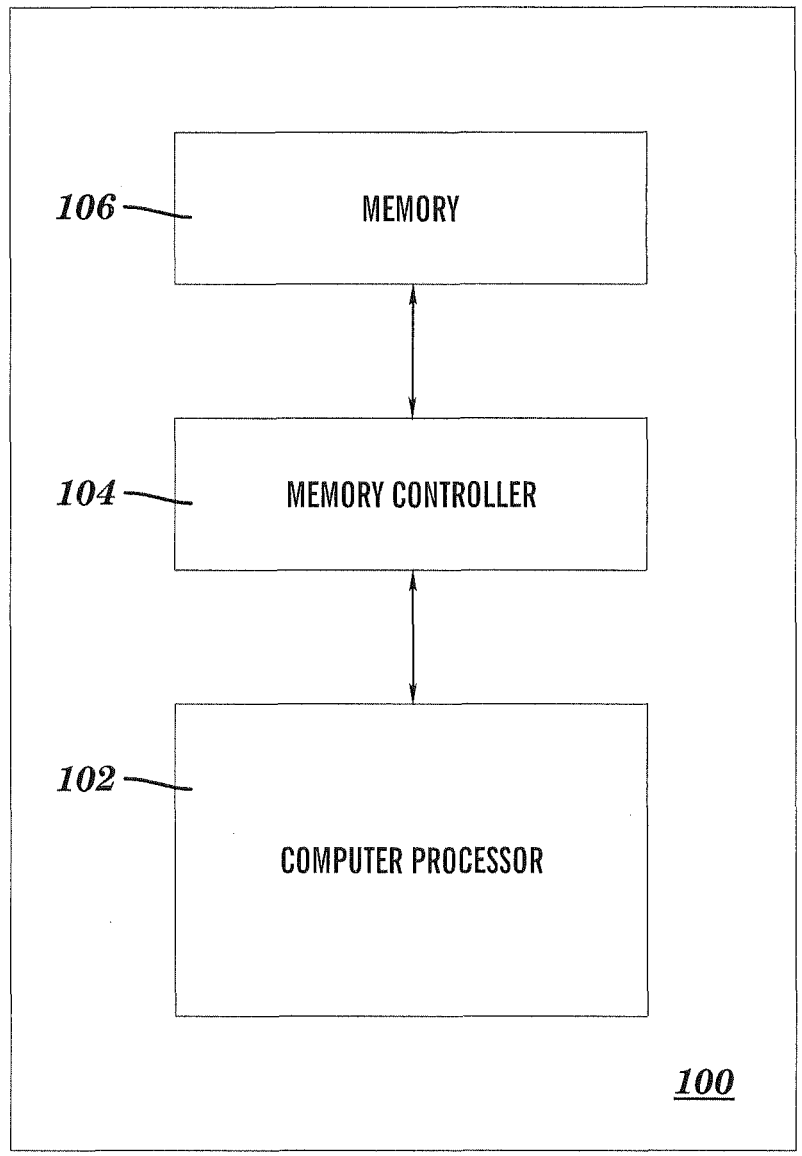
FIG. 1 illustrates a block diagram of a system for storing and retrieving data in a memory in accordance with an embodiment.

An embodiment of the present invention combines the tasks of data migration and garbage collection in a hybrid storage system. In an embodiment, the hybrid storage system is logically partitioned into a pool of high performance memory blocks with data written in a high performance mode, a pool of high capacity memory blocks with data written in a high capacity mode, and a pool of free memory blocks that are available for use by either of the other pools. In some implementations, the pool of free memory blocks can be partitioned in free memory blocks that can be used in the high performance memory and a pool of memory blocks that can be used in a high capacity memory. In general, high performance memory blocks allow faster writes but have a lower capacity when compared to high capacity memory blocks. For example, high performance memory blocks can have content written in single-level cell (SLC) mode and high capacity memory blocks can have content written in multi-level cell (MLC) mode. Embodiments described herein can provide a high level of memory system performance through servicing write requests by writing in a high performance mode and migrating the data over time to a higher capacity mode. In addition, embodiments can provide an increased level of memory system endurance by combining the tasks of data migration and garbage collection. Data migration, as known in the art, refers to the movement of data between memory blocks, for example, from high performance memory blocks to high capacity memory blocks. Garbage collection, as known in the art is used by memories where the erasing unit (e.g., block) is larger than the writing unit (e.g., page), and refers to the process of reclaiming memory space for use, for example, by future write operations.

One technique used to prolong the lifetime and performance of a flash memory device is to physically partition the memory into sections, one for high performance memory and the other for high capacity memory. Data is then migrated from one section to the other while managing the internals of such memories separately. This technique can result in the high performance memory wearing significantly more than the high capacity memory because it will be written to more frequently and, thus, it can end up limiting the overall endurance of the flash memory device. Another issue with this technique is that managing these two sections separately incurs significant cost overheads that can be eliminated by embodiments described herein.

Embodiments described herein are directed to memory that has data written in two different ways, for example, a high capacity mode and a high performance mode. In the context of flash, these may be identified as (1) MLC and (2) MLC written to as SLC (e.g., through a special mode available from the manufacturer, or by writing data so that only a subset of the levels available in MLC are written to).

MLC written to as SLC is referred to herein as "SLC" or "SLC mode." Embodiments described herein facilitate one or more of: deciding which physical sections of the memory are kept in either of the two modes, what portions of the data are stored on either of the two physical sections, how data migrates from one section to another, and how the act of garbage collection takes place in such a situation.

Embodiments described herein simultaneously combine the tasks of data migration from one section of the memory to another one, garbage collection, and management in order to achieve high performance and endurance in a single architecture. Embodiments utilize a single pool of free memory blocks, which results in less management overhead than architectures that require multiple pools of free memory blocks. In addition, the combination of data migration and garbage collection where metrics related to both an age of the data (e.g., when it was last written to) and whether the data is a candidate for garbage collection (e.g., a percent of active data) are used when deciding what data to migrate from one mode (e.g., SLC) to another (e.g., MLC) can result in enhanced endurance when compared to existing hybrid memories.

FIG. 1 illustrates a block diagram of a system for storing and retrieving data in a memory in accordance with an embodiment. The system 100 depicted in FIG. 1 includes a computer processor 102, a memory 106 having memory cells, and a memory controller 104 for receiving data from the computer processor 102 to be stored in the memory 106. In an embodiment, the memory cells are arranged into pages, and pages are arranged into blocks. Thus, a block may contain a plurality of pages, each page containing a plurality of memory cells.

In one embodiment the memory controller 104 is in communication with, or communicatively coupled to, the computer processor 102 (e.g., via an input/output bus) and receives write requests from the computer processor 102. The write requests contain data to be written to the memory 106 and a logical address for identifying the location in the memory 106 to which the data will be written. The memory controller 104 stores data at a physical address within the memory 106. In an embodiment, the memory controller 104 maps the logic address to a physical address in the memory 106 when storing or retrieving data. The physical address for a given logical address can change each time data in the memory 106 is modified. In exemplary embodiments, when the memory 106 is implemented by one or more flash memory devices, the memory controller 104 controls the writing of data in both SLC and MLC modes. A memory controller 104 that includes computer instructions to control data stored in a memory 106 in two or more modes can be referred to as a hybrid memory controller.

The system 100 shown in FIG. 1 is one example of a configuration that may be utilized to perform the processing described herein. Although the system 100 has been depicted with only a single memory 106, memory controller 104, and computer processor 102, it will be understood that other embodiments would also operate in other systems with two or more of the memory 106 (e.g., the memory spans two more physical flash devices), memory controller 104, or computer processor. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
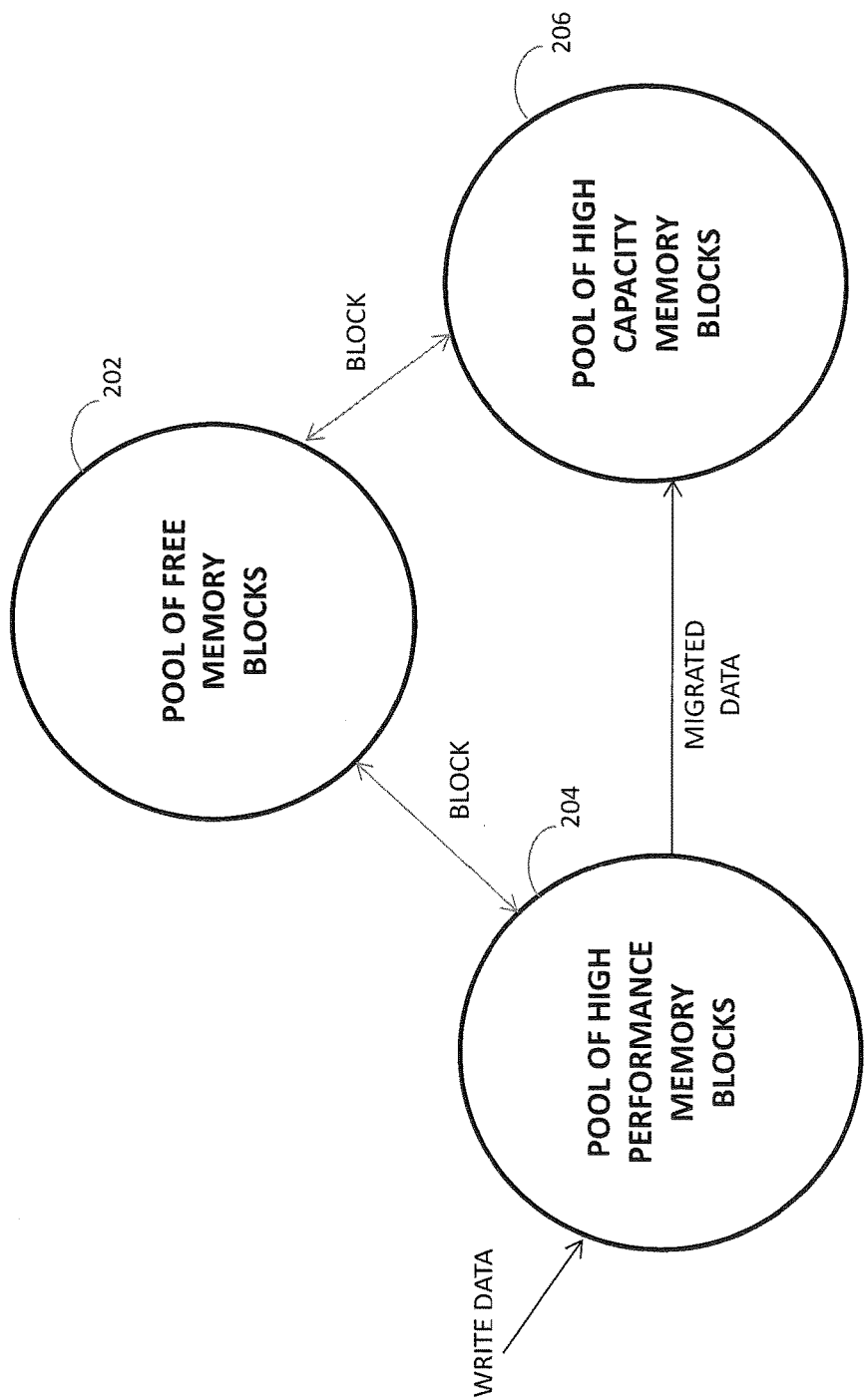
FIG. 2 illustrates a block diagram of memory pools in accordance with an embodiment.

Turning now to FIG. 2, a block diagram of a pool of free memory blocks 202, a pool of high performance memory blocks 204, and a pool of high capacity memory blocks 206 are generally shown in accordance with an embodiment. These pools are a logical division of memory blocks that may be physically located on memory devices in the memory 106, and the pools may be managed by computer instructions (e.g., hardware, software, firmware) located, for example, in the memory controller 104. As shown in FIG. 2, at any given point in time, a flash memory block can be operating in high performance (e.g., SLC), high capacity (e.g., MLC), or free mode (potential to be either SLC or MLC). Memory blocks that are operating in high performance or high capacity mode are either writable or closed. Writeable memory blocks include pages that can be written to, and closed memory blocks do not have pages that can be written to.

The memory controller 104 can label the memory blocks in the memory 106 to identify what pool they currently logically belong to and whether they are writable or closed. The label can include metadata associated with a memory block and/or a memory page with information describing such label. In addition, some memory technologies may require a special configuration to be sent so that a memory block or memory page can function in either a high performance or high capacity mode. In this case, the act of "labeling" can also include eventually sending such configuration to the memory 106 (e.g., memory device) so that the memory block can function in the desired mode.

As shown in FIG. 2, write data can be written to a memory block in the pool of high performance memory blocks 204. Also shown in FIG. 2, data (e.g., memory pages) can be migrated from memory blocks in the pool of high performance memory blocks 204 to writable memory blocks in the pool of high capacity memory blocks 206. In addition, free blocks from the pool of free memory blocks 202 can be added (logically) to the pool of high performance memory blocks 204 and to the pool of high capacity memory blocks 206. Similarly, blocks that are no longer utilized may be moved (logically) from either the pool of high performance memory blocks 204 or the pool of high capacity memory blocks 206 back to the pool of free memory blocks 202. The logical movement of blocks can be controlled by the memory controller 104 using, for example, metadata and/or labeling to track a current status of a memory block or memory page.

The pool of free memory blocks 202 can be replenished as blocks are freed from the memory regions that contain either the high performance memory blocks 204 or the high capacity memory blocks 206. In the case of the region that contains the high capacity memory blocks 206, an example of a situation where a memory block is freed occurs when a write to a high capacity memory block is made to a logical address that previously existed in the high capacity region, and the page is invalidated. Similar to the standard way in which flash is managed, the accumulation of invalidated pages leads to the act of "garbage collection", which is a process of moving data that is still valid/active into blocks in order to free up blocks so that they can be returned to the pool of free memory blocks 202. Another reason that a page may be invalidated in the high capacity region occurs when the page is migrated back to the high performance region, for example, when a write happens to that page.

Figure 3:
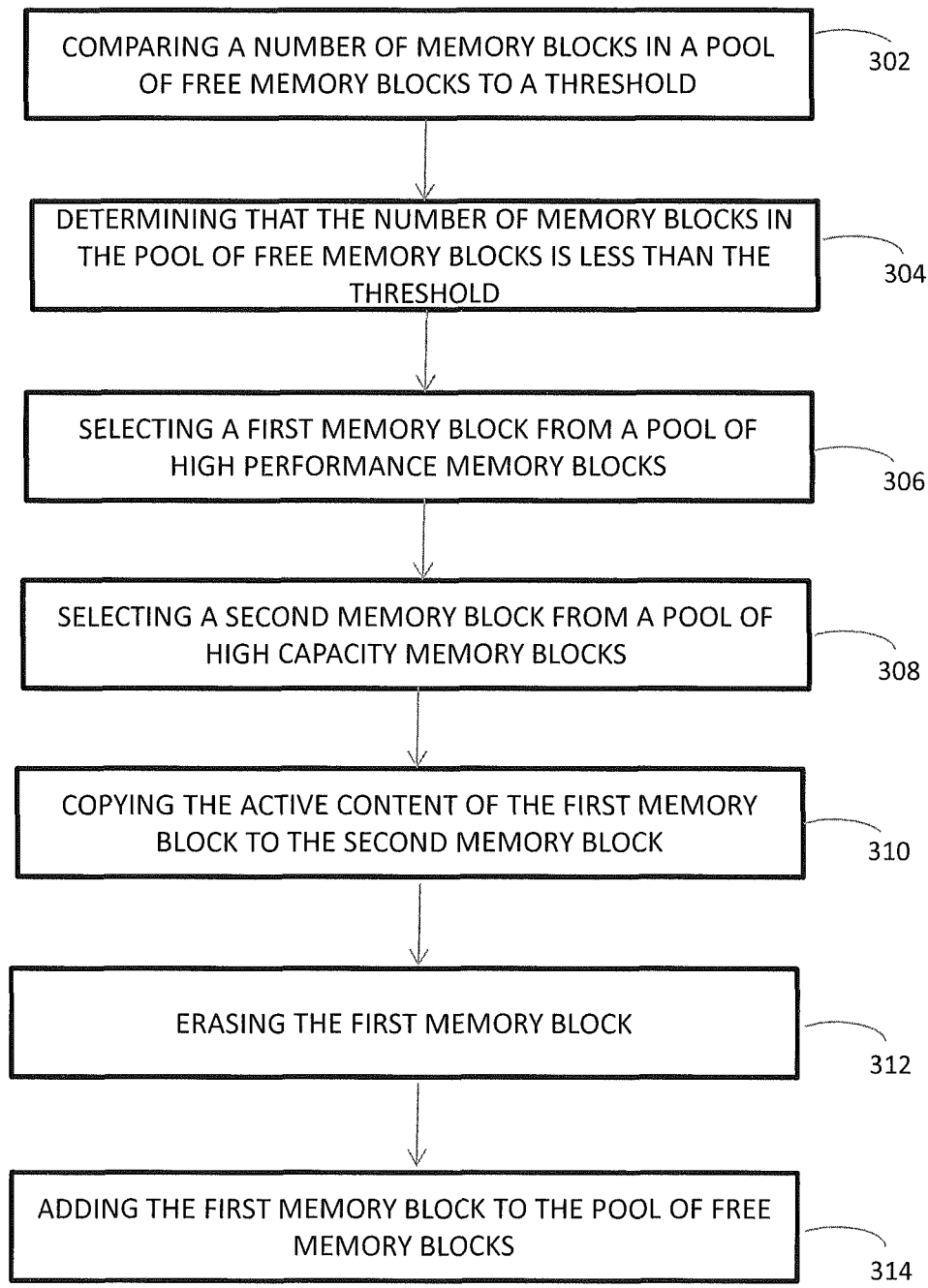
FIG. 3 illustrates a process flow for performing data migration and garbage collection in accordance with an embodiment.

Turning now to FIG. 3, a process flow for simultaneously performing data migration and garbage collection is generally shown in accordance with an embodiment. The processing shown in FIG. 3 can be performed by the memory controller 104 on a periodic basis and/or based on specific trigger events occurring (e.g., a certain number of writes to the memory 106 being serviced). At processing block 302, a number of memory blocks in the pool of free memory blocks 202 is compared to a threshold (e.g., preselected based on an expected volume of write data), and at processing block 304 it is determined that the number of memory blocks in the pool of free memory blocks 202 is less than the threshold.

At processing block 306 of FIG. 3, a first memory block from the pool of high performance memory blocks 204 is selected for conversion into the pool of free memory blocks 202. The first memory block can be selected based on one more factors such as, but not limited to: a percent of writable pages in the memory block, a percent of active pages in the memory block, and a time since a page in the memory block was last accessed. As used herein, the term "active" refers to content (e.g., of a page) that has been accessed within a specified time period and/or that is likely to be accessed within a specified time period. The content of a memory block can be classified (e.g., by the memory controller 104) as active or non-active (or "stale") based on time thresholds.

The memory controller 104 can select the first memory block on the basis of how many stale pages it has, thus selecting a memory block from the pool of high performance memory blocks 204 with the largest number of stale pages. Alternatively, the first memory block can be selected on the basis of the last time the active pages in the memory block were accessed (e.g., written to). Another embodiment combines these first two approaches by giving each memory block in the pool of high performance memory blocks 204 an "eviction score" that is based on both a number of stale pages in a memory block and a time since a last access (e.g., write to) of the active pages. In this embodiment, a memory block which only has stale pages will have a larger eviction score (and therefore be selected before) a memory block which has both active and stale pages. Further, two memory blocks which have the same number of stale pages will have their eviction scores determined by the last time any active pages were written to, with a memory block having the oldest (in terms of write time) active page being selected for eviction before another memory block. Additional criteria can be considered in the eviction score such as the number of write/erase cycles in the given physical block, so that we can wear leveling concerns can be considered.

At processing block 308, a second memory block is selected from the pool of high performance memory blocks 204. The second memory block has the characteristic that it has at least one writable page (this usually means that it has not been written after the last erase on that page). Typically, a memory controller maintains at least one such block and may choose the block to write to based on considerations such as: the congestion of the memory chip/die which has the block, the wear of the block, or even an arbitrary order in which it chooses to write to such blocks. If there are no memory blocks in the pool of high capacity memory blocks 204 that contain a writable page, then a memory block can be selected from the pool of free memory blocks 202 and logically added to the pool of high capacity memory blocks 206 as a high capacity, writable memory block. This new memory block can be selected at processing block 308. In an embodiment, the selection of a new memory block can be based on how long the blocks have been in the free memory pool (oldest free block first). In a more sophisticated embodiment, the selection can be based on the amount of wear that the free memory blocks have accumulated so far (least worn block first).

Processing continues at processing block 310 in FIG. 3 with copying active content from the first memory block to the second memory block. The first memory block is erased at processing block 312 and added to the pool of free memory blocks 202 at processing block 314. In this manner a memory block that is operating in a high performance mode is converted into the pool of free memory blocks 202

In some situations, the writer knows that the data being written will not be written to again in the near future. In that case, it may be desired to write such data to the high capacity region, since doing so would avoid the likely migration action and associated cost that would ensue. Embodiments described herein allow for this by accepting a signal indicating that the data should be written directly to the high capacity region.

Each pool can be spread across several devices or kept to separate physical devices, depending on whether the physical characteristics of the memory devices allow mixing high capacity mode and high performance mode in the same device Some memory technologies may be able to function in either high performance or high capacity mode purely based on either the values of the data written to a memory device or by selecting which parts of the memory are written to. For example, in flash technology it may be possible to effectively write data to only certain pages of a block which results in less damage to the cells than if all pages of the block are written to. The reason is that in two-bit/cell flash technology, some pages in a block are encoded as specific levels in the multi-bit cell which cause less wear when written to than the other levels. Thus, in flash technology there is often a level or levels that cause less wear to the memory when used to program memory cells. This in fact extends beyond two-bits/cell to more generally more than one-bit/cell situations. Embodiments described herein can take advantage of such a level by using special data codes to write data in a way such that such a level is used more frequently. In addition, embodiments described herein can also utilize data codes that allow multiple writes to a memory page.

Figure 4:
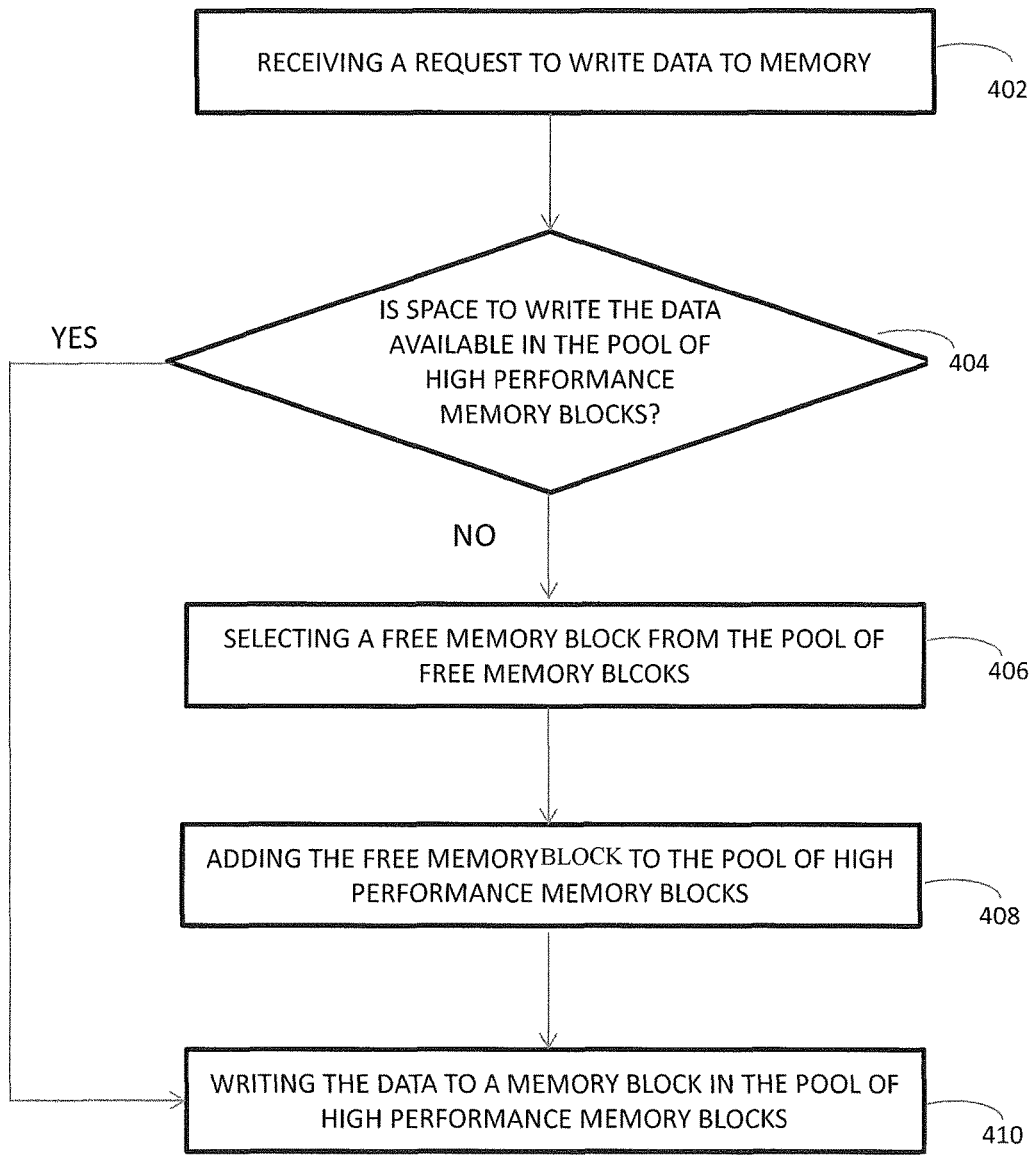
FIG. 4 illustrates a process flow for writing data to memory in accordance with an embodiment.

Turning now to FIG. 4, a process flow for writing data to memory is generally shown in accordance with an embodiment. The processing shown in FIG. 4 can be performed by the memory controller 104 in response to receiving a write request from the computer processor 102. At processing block 402, a request to write data to memory is received. At block 404, it is determined if there is space on the memory blocks located in the pool of high performance memory blocks 204 to write the data. In an embodiment, space in the pool of high performance memory blocks 204 is not available if writing the data would result in reducing a number of spare blocks or spare pages beyond a selected level. If it is determined, at processing block 404, that there is space available to write the data, then processing block 410 is performed and the data is written to a memory block in the pool of high performance memory blocks 204. If it is determined, at processing block 404, that space is not available in the pool of high performance memory blocks 204 to write the data, then processing continues at block 406, where a memory block is selected from the pool of free memory blocks 202, and at processing block 408, the selected memory block is added (e.g., labeled, metadata updated) to the pool of high performance memory blocks 204 as a writable block. Servicing the write request completes at processing block 410, with the data being written to the memory block that was added, at processing block 408, to the pool of high performance memory blocks 204.

Technical effects and benefits include reducing write amplification by combining data migration with garbage collection. In addition, performance of memory writes can be improved with a relatively minor impact on capacity by writing data to high performance memory blocks and migrating the data over time to high capacity memory blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for storing data in a memory, the method comprising:
   comparing a number of memory blocks in a first pool of free memory blocks in the memory to a threshold, the memory including memory blocks logically divided into the first pool of free memory blocks, a second pool of high performance memory blocks and a third pool of high capacity memory blocks, wherein:
     the comparing is performed based at least in part on detecting that a specified number of writes to the memory have been serviced,
     the specified number of writes is greater than one, and
     the writes to the memory are serviced by writing in a high performance mode to the high performance memory blocks; and
   expanding the first pool of free memory blocks based on determining that the number of memory blocks in the first pool of free memory blocks is less than the threshold, the expanding including:
     migrating data from a high performance memory block to a high capacity memory block, the migrating including:
       selecting a first memory block from the second pool of high performance memory blocks, the first memory block comprising active and non-active content, wherein the selecting a first memory block is based at least in part on concurrently taking into account a percent of the active content in the first memory block and an amount of time since a page in the first memory block was accessed;
       selecting a second memory block from the third pool of high capacity memory blocks; and
       copying the active content of the first memory block to the second memory block;
     reclaiming space for use by future write operations from the first memory block, the reclaiming responsive to the migrating and including erasing the first memory block; and
     adding the first memory block to the first pool of free memory blocks.

2. The method of claim 1, wherein the high capacity memory blocks are formatted for multi-level cell (MLC) writes.

3. The method of claim 1, wherein the high performance memory blocks are formatted for single-level cell (SLC) writes.

4. The method of claim 1 further comprising:
   determining that the third pool of high capacity memory blocks does not have a memory block available for selection;
   selecting the second memory block from the first pool of free memory blocks; and
   adding the second memory block to the third pool of high capacity memory blocks.

5. The method of claim 1, wherein the comparing is further performed periodically.

6. The method of claim 1, further comprising:
   receiving a request to write data to the memory; and
   servicing the write request, the servicing including:
     determining whether space to write the data is available in the second pool of high performance memory blocks;
     based on determining that space to write the data is not available in the second pool of high performance memory blocks:
       selecting a free memory block from the first pool of free memory blocks; and
       adding the free memory block to the second pool of high performance memory blocks; and
     writing the data to a memory block in the second pool of high performance memory blocks.

7. The method of claim 6, wherein the comparing and expanding are performed independently of the receiving and servicing.

8. The method of claim 6, wherein the comparing and expanding overlap in time with the receiving and servicing.

9. The method of claim 1, wherein the memory is flash memory.

10. The method of claim 1, wherein the memory comprises a plurality of memory devices and each memory device contains portions of more than one of the first pool of free memory blocks, the second pool of high performance memory blocks and the third pool of high capacity memory blocks.

11. The method of claim 1, wherein the memory comprises a plurality of memory devices and each memory device is occupied by at most one of the second pool of high performance memory blocks and the third pool of high capacity memory blocks.

12. A system comprising:
   a memory controller in communication with a memory, the system configured to perform a method comprising:
     comparing a number of memory blocks in a first pool of free memory blocks in the memory to a threshold, the memory including memory blocks logically divided into the first pool of free memory blocks, a second pool of high performance memory blocks and a third pool of high capacity memory blocks, wherein:

the comparing is performed based at least in part on detecting that a specified number of writes to the memory have been serviced, the specified number of writes is greater than one, and the writes to the memory are serviced by writing in a high performance mode to the high performance memory blocks; and expanding the first pool of free memory blocks based on determining that the number of memory blocks in the first pool of free memory blocks is less than the threshold, the expanding including:

migrating data from a high performance memory block to a high capacity memory block, the migrating including:

selecting a first memory block from the second pool of high performance memory blocks, the first memory block comprising active and non-active content, wherein the selecting a first memory block is based at least in part on concurrently taking into account a percent of the active content in the first memory block and an amount of time since a page in the first memory block was accessed;

selecting a second memory block from the third pool of high capacity memory blocks; and copying the active content of the first memory block to the second memory block;

reclaiming space for use by future write operations from the first memory block, the reclaiming responsive to the migrating and including erasing the first memory block; and adding the first memory block to the first pool of free memory blocks.

13. The system of claim 12, wherein the memory is flash memory, the high capacity memory blocks are formatted for multi-level cell (MLC) writes, and the high performance memory blocks are formatted for single-level cell (SLC) writes.

14. The system of claim 12, wherein the system is further configured for:

determining that the third pool of high capacity memory blocks does not have a memory block available for selection;

selecting the second memory block from the first pool of free memory blocks; and adding the second memory block to the third pool of high capacity memory blocks.

15. The system of claim 12, wherein the system is further configured for:

receiving a request to write data to the memory; and servicing the write request, the servicing including:

determining whether space to write the data is available in the second pool of high performance memory blocks;

based on determining that space to write the data is not available in the second pool of high performance memory blocks:

selecting a free memory block from the first pool of free memory blocks; and adding the free memory block to the second pool of high performance memory blocks; and writing the data to a memory block in the second pool of high performance memory blocks.

16. A computer program product for storing data in memory, the computer program product comprising:

a non-transitory computer readable storage medium having program instructions embodied therewith, the program instructions executable by a processor to cause the processor to:

compare a number of memory blocks in a first pool of free memory blocks in the memory to a threshold, the memory including memory blocks logically divided into the first pool of free memory blocks, a second pool of high performance memory blocks and a third pool of high capacity memory blocks, wherein:

the comparing is performed based at least in part on detecting that a specified number of writes to the memory have been serviced, the specified number of writes is greater than one, and the writes to the memory are serviced by writing in a high performance mode to the high performance memory blocks; and expand the first pool of free memory blocks based on determining that the number of memory blocks in the first pool of free memory blocks is less than the threshold, the expanding including:

migrating data from a high performance memory block to a high capacity memory block, the migrating including:

selecting a first memory block from the second pool of high performance memory blocks, the first memory block comprising active and non-active content, wherein the selecting a first memory block is based at least in part on concurrently taking into account a percent of the active content in the first memory block and an amount of time since a page in the first memory block was accessed;

selecting a second memory block from the third pool of high capacity memory blocks; and copying the active content of the first memory block to the second memory block;

reclaiming space for use by future write operations from the first memory block, the reclaiming responsive to the migrating and including erasing the first memory block; and adding the first memory block to the first pool of free memory blocks.

* * * * *